US012088380B2

(12) United States Patent
Niu et al.

(10) Patent No.: US 12,088,380 B2
(45) Date of Patent: Sep. 10, 2024

(54) ARTIFICIAL INTELLIGENCE BASED CHANNEL STATE INFORMATION FRAMEWORK

(71) Applicant: Apple Inc., Cupertino, CA (US)

(72) Inventors: Huaning Niu, San Jose, CA (US); Chunxuan Ye, San Diego, CA (US); Sigen Ye, San Diego, CA (US); Oghenekome Oteri, San Diego, CA (US); Wei Zeng, San Diego, CA (US); Weidong Yang, San Diego, CA (US); Haitong Sun, Cupertino, CA (US); Yushu Zhang, Beijing (CN); Seyed Ali Akbar Fakoorian, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 17/918,939

(22) PCT Filed: Nov. 19, 2021

(86) PCT No.: PCT/CN2021/131644
§ 371 (c)(1),
(2) Date: Oct. 14, 2022

(87) PCT Pub. No.: WO2023/087235
PCT Pub. Date: May 25, 2023

(65) Prior Publication Data
US 2023/0283340 A1    Sep. 7, 2023

(51) Int. Cl.
*H04B 7/06*    (2006.01)
*H04W 28/02*    (2009.01)

(52) U.S. Cl.
CPC ......... *H04B 7/0626* (2013.01); *H04B 7/0608* (2013.01); *H04W 28/0215* (2013.01)

(58) Field of Classification Search
CPC ............... H04B 7/0626; H04B 7/0608; H04W 28/0215
See application file for complete search history.

(56) References Cited

U.S. PATENT DOCUMENTS

2020/0366326 A1    11/2020  Jassal
2021/0185515 A1     6/2021  Bao
(Continued)

FOREIGN PATENT DOCUMENTS

CN         113381790        9/2021
WO        2021208061       10/2021

OTHER PUBLICATIONS

International Search Report for PCT/CN2021/131644; Apr. 25, 2022.

(Continued)

*Primary Examiner* — Janice N Tieu
(74) *Attorney, Agent, or Firm* — Kowert, Hood, Munyon, Rankin & Goetzel, P.C.

(57) ABSTRACT

This disclosure relates to techniques for providing an artificial intelligence based framework for performing channel state information reporting in a wireless communication system. A cellular base station may provide system information for a cell to a wireless device. The system information may indicate that the cell supports artificial intelligence based channel state information reporting. The wireless device may provide wireless device capability information to the cellular base station. The capability information may indicate that the wireless device supports artificial intelligence based channel state information reporting. The wireless device may determine an artificial intelligence model to use to perform channel state information reporting with the cell, and may perform channel state information reporting using the selected artificial intelligence model.

20 Claims, 5 Drawing Sheets

(56) References Cited

U.S. PATENT DOCUMENTS

| | | | |
|---|---|---|---|
| 2021/0195462 A1 | 6/2021 | Pezeshki | |
| 2021/0297178 A1* | 9/2021 | Kim | |
| 2023/0006913 A1* | 1/2023 | Lo | H04L 43/0864 |
| 2023/0035125 A1* | 2/2023 | Pick | H04W 76/25 |
| 2023/0232213 A1* | 7/2023 | Hong | H04W 8/24 |
| | | | 370/329 |
| 2023/0344490 A1* | 10/2023 | Kang | H04B 17/318 |

OTHER PUBLICATIONS

CMCC "Use Cases for Artificial Intelligence in RAN"; 3GPP TSG RAN WG3 meeting #110; Nov. 12, 2020.

* cited by examiner

ARTIFICIAL INTELLIGENCE BASED CHANNEL STATE INFORMATION FRAMEWORK

PRIORITY CLAIM

This application is a national phase entry of PCT application number PCT/CN2021/131644, entitled "Artificial Intelligence Based Channel State Information Framework," filed Nov. 19, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for providing an artificial intelligence based framework for performing channel state information reporting in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH$^T$m, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for providing an artificial intelligence based framework for performing channel state information reporting in a wireless communication system.

The artificial intelligence based framework for performing channel state information reporting may be network controlled, wireless device controlled, or may include portions independently controlled by each of the network and the wireless device.

A mechanism may be provided for each of the wireless device and the network to signal their support for artificial intelligence based channel state information reporting to each other, potentially including providing further details regarding specific aspects supported by each party. For example, a cellular base station may be able to provide such information in system information broadcasted by the cellular base station, while the wireless device may be able to provide such information in wireless device capability information provided to the cellular base station by the wireless device by way of radio resource control signaling.

Techniques are also described relating to how the wireless device and the cellular network can determine and obtain the artificial intelligence to be used for the artificial intelligence based channel state information reporting. Such techniques may include network side training and provision of the artificial intelligence model to the wireless device in a network controlled framework, or wireless device side training and provision of the artificial intelligence model to the cellular base station in a wireless device controlled framework, or independent training and storage of their respective portions of the artificial intelligence model by each of the wireless device and the cellular network in a distributed-control framework. Additionally, framework elements in which a wireless device can modify an artificial intelligence model trained and provided by a cellular network are also described herein.

Once the artificial intelligence model to use has been determined, the wireless device may be able to artificial intelligence based channel state information reporting using the determined artificial intelligence model. The reporting may be performed as requested by the network, for example when the network sends an aperiodic channel state information request to the wireless device. The artificial intelligence based channel state information reporting may be performed using a report format or type specified or otherwise agreed upon for use for performing artificial intelligence based channel state information reporting.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
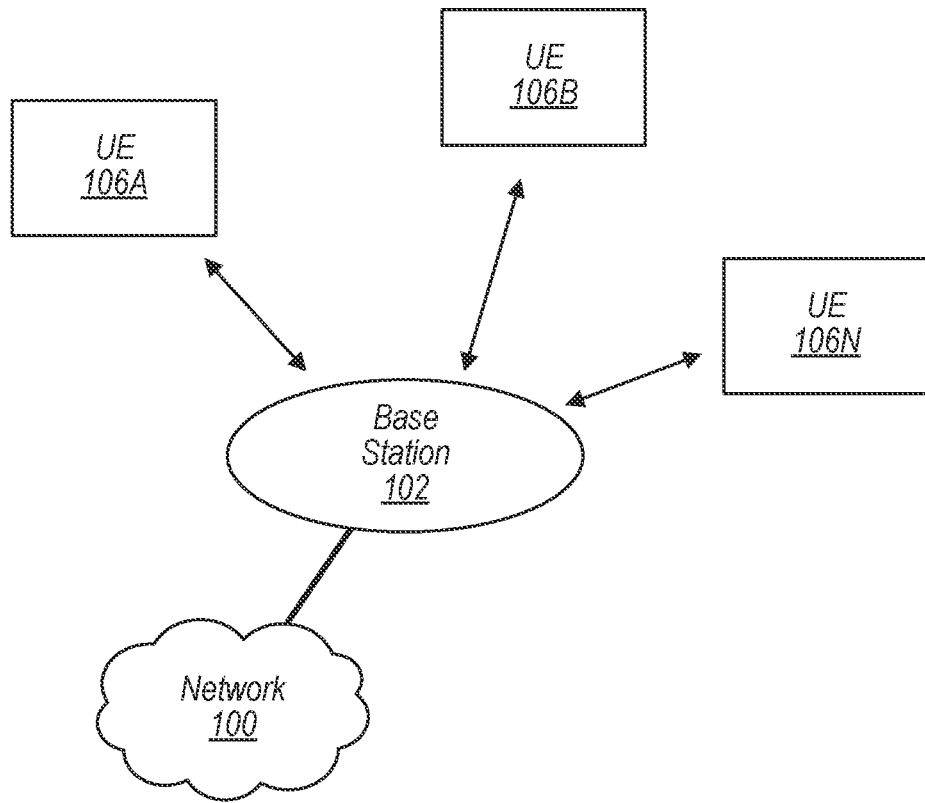
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
AI: Artificial Intelligence
NN: Neural Network
CSI: Channel State Information
CQI: Channel Quality Indicator
PMI: Precoding Matrix Indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
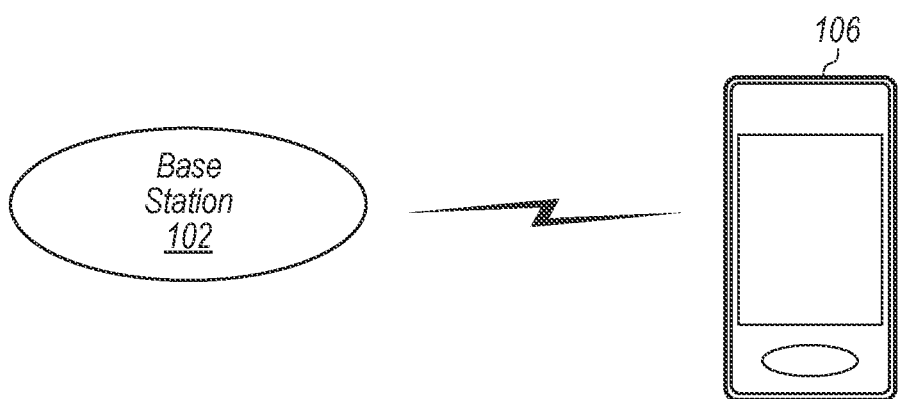
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5GNR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform channel state information reporting according to an artificial intelligence based framework for performing channel state information reporting in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
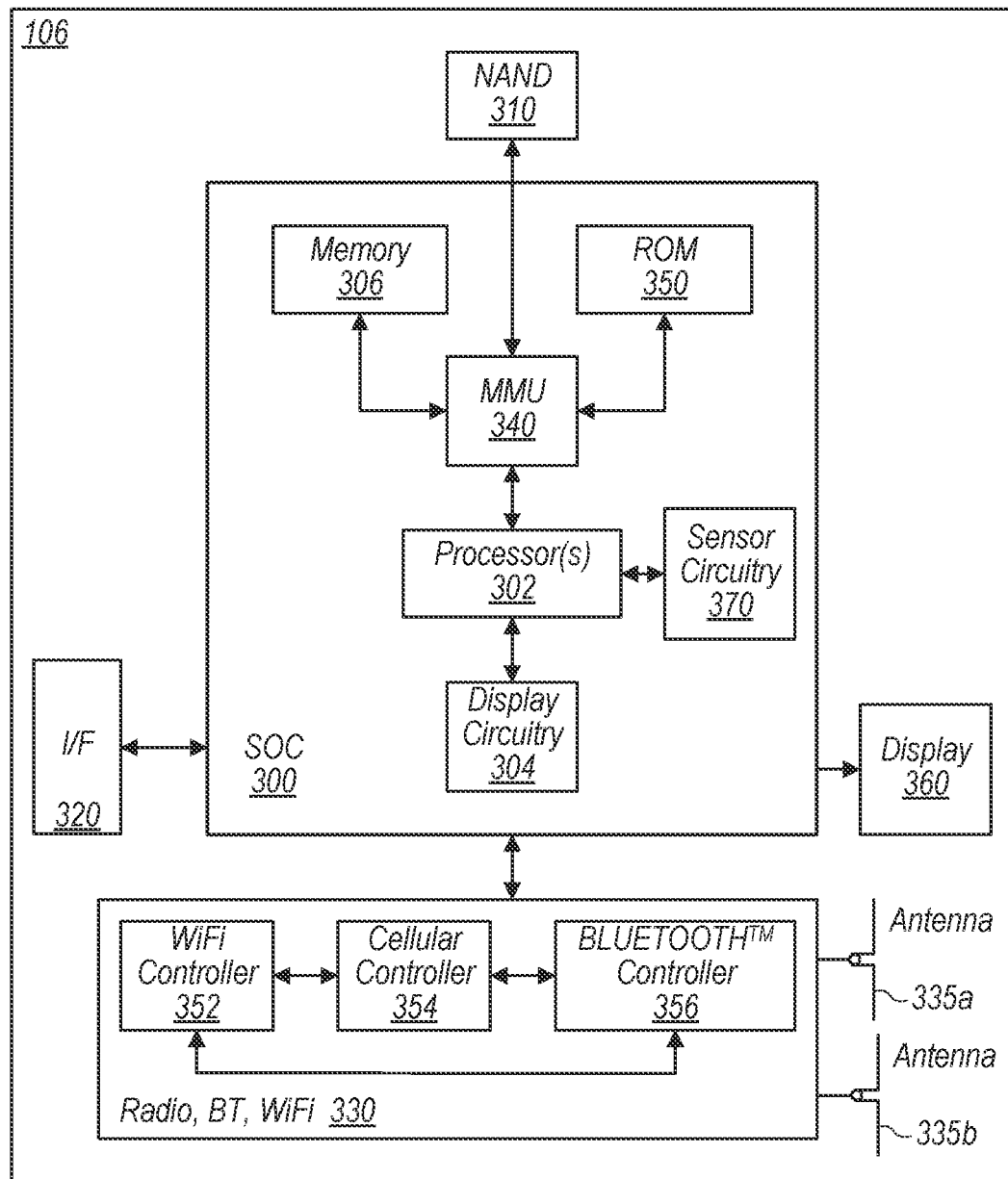
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335 a), and possibly multiple antennas (e.g. illustrated by antennas 335 a and 335 b), for performing wireless communication with base stations and/or other devices. Antennas 335 a and 335 b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for channel state information reporting according to an artificial intelligence based framework for performing channel state information reporting in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for channel state information reporting according to an artificial intelligence based framework for performing channel state information reporting in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
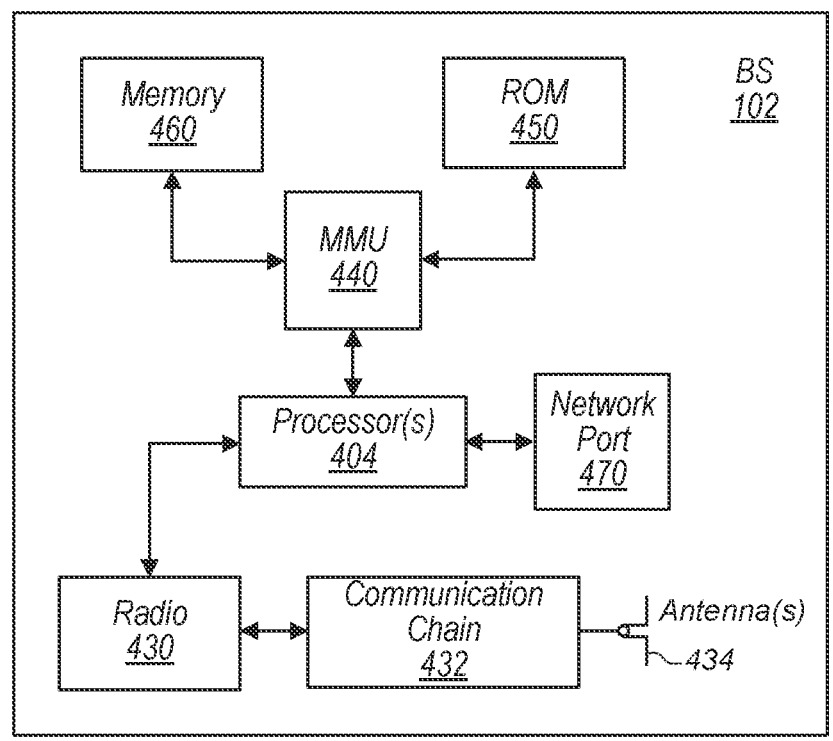
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQ value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
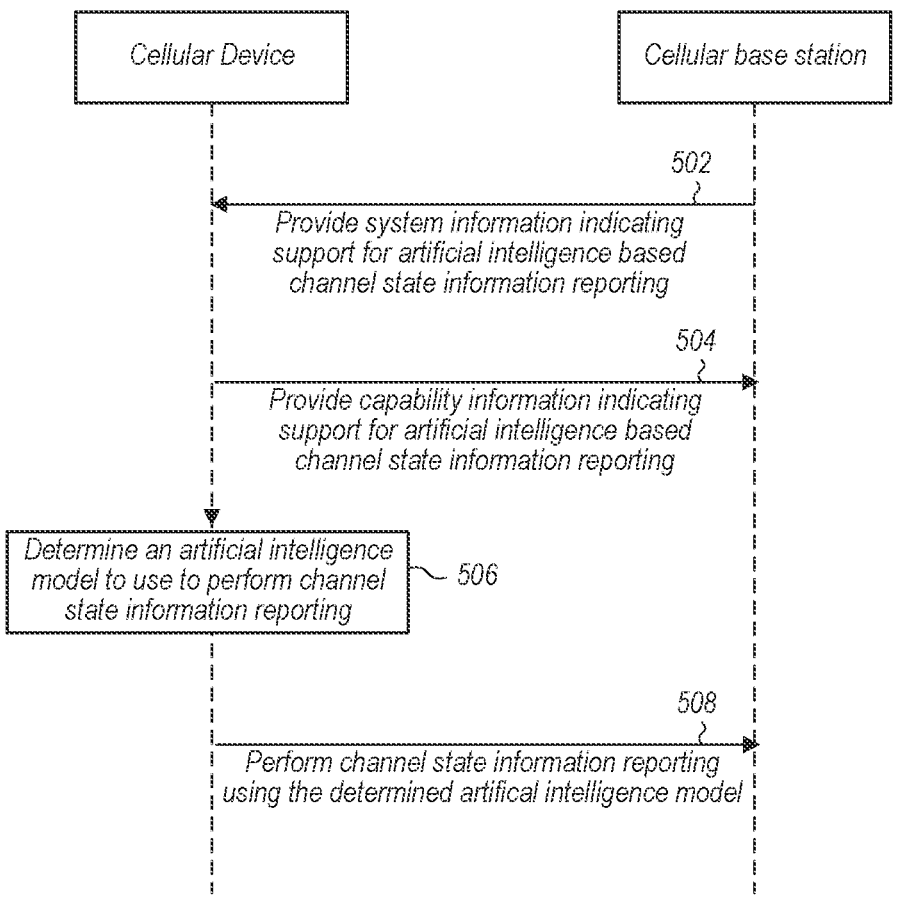
FIG. 5 is a signal flow diagram illustrating aspects of an exemplary possible method for providing an artificial intelligence based framework for performing channel state information reporting in a wireless communication system, according to some embodiments.

FIG. 5—Artificial Intelligence Based Channel State Information Reporting Framework Increasing interest is developing in use of artificial intelligence and machine learning type algorithms. It may be possible to utilize such tools in any of a variety of possible areas of cellular communication. One such area may include the manner in which channel state information feedback for a channel between a wireless device and a cell is collected, analyzed, and/or reported. In order to facilitate such use, it may be important to provide a framework according to which a wireless device and a cellular network can exchange information to determine whether such techniques are mutually supported and potentially to negotiate or agree upon the characteristics and parameters according to which artificial intelligence based channel state information reporting is performed.

Thus, it may be beneficial to specify techniques for supporting artificial intelligence based channel state information reporting. To illustrate one such set of possible techniques, FIG. 5 is a signal flow diagram illustrating a method for performing artificial intelligence based channel state information reporting in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs (e.g., that act as transmission reception points (TRPs)) that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a cellular base station that provides a serving cell to the wireless device, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities, potentially including whether the wireless device supports artificial intelligence based channel state information reporting.

In 502, the cellular base station may provide system information indicating that a cell (e.g., that is provided by the cellular base station) supports artificial intelligence based channel state information reporting. The system information may be provided by way of one or more broadcast or on-demand system information blocks (SIBs), according to some embodiments. It may also be possible for some or all information configuring artificial intelligence based channel state information reporting between the cellular base station and the wireless device can be provided by way of dedicated signaling, such as by way of RRC control signaling.

The system information may include any of a variety of possible types of information regarding whether artificial intelligence based channel state information reporting is supported and/or the artificial intelligence based channel state information reporting configuration for the cell. Such information could include one or more artificial intelligence model identifiers supported by the cell, as one possibility. Note that, at least in some embodiments, each artificial intelligence model identified by an artificial intelligence model identifier may include an artificial intelligence encoder (e.g., for use at the wireless device side) and an artificial intelligence decoder (e.g., for use at the cellular base station side) portion.

As an example, in some instances, it may be possible for multiple neural network models, each potentially differing from the other neural network models with respect to one or more characteristics (e.g., type, complexity, training data set, and/or any of a variety of possible parameters) to be defined, including potentially configuring or specifying identifier information (e.g., index values, as one possibility) for each such neural network model that has been defined. Such different neural network models may be generated (e.g., configured with various parameters and trained using appropriate training data) such as to provide neural network models that are applicable in a variety of use cases, such as for cells with different sizes, for cells provided by different types or vendors of cellular infrastructure equipment, for cells associated with different public land mobile networks (PLMNs), for wireless devices with differing capabilities, characteristics, or configured communication parameters within a cell, and/or for any of various other possible use cases. Thus, in such an example, the system information could include information indicating one or more neural network model identifiers, where each is associated with a neural network model supported by the cell. Note that according to various embodiments, the artificial intelligence model identifiers may be uniquely defined at any of a variety of possible levels of granularity. For example, artificial intelligence model identifiers may be unique per PLMN, or may be unique per AMF, or may be unique per centralized unit control plane (CU-CP), among various possibilities.

As another possibility, it may be the case that the SIB indicates that artificial intelligence based channel state information reporting is supported, without including the detailed module description of characteristics (e.g., type, complexity, training data set, and/or any of a variety of possible parameters). In such a scenario, wireless device specific signaling (e.g., dedicated RRC signaling) may be used to indicate the detailed module description (e.g., after the wireless device has provided capability information in step 504), at least according to some embodiments.

Additionally, or alternatively, the system information could include any of various other information regarding the type of support for artificial intelligence based channel state information reporting provided by the cell. Such information could include one or more artificial intelligence model types (e.g., convolutional neural network, recurrent neural network, etc.) or complexities supported by the cell, one or more supported input types (e.g., channel or eigenvector) for artificial intelligence based channel state information reporting for the cell, and/or one or more supported output types (e.g., supported channel state information reporting format(s)) for artificial intelligence based channel state information reporting for the cell, among various possibilities.

In 504, the wireless device may provide capability information indicating that the wireless device supports artificial intelligence based channel state information reporting. The capability information may be provided via RRC signaling when establishing a RRC connection, as one possibility. Other signaling mechanisms and/or times may also or alternatively be used to provide the capability information. At least according to some embodiments, the capability indicating that the wireless device supports artificial intelligence based channel state information reporting may be provided based at least on (e.g., in response to) receiving the system information indicating support by the cell for artificial intelligence based channel state information reporting.

The capability information may include any of a variety of possible types of information regarding whether artificial intelligence based channel state information reporting is supported by the wireless device. Such information could include one or more artificial intelligence model identifiers supported by the wireless device, as one possibility. The artificial intelligence model identifier information indicated by the wireless device may identify one or more artificial intelligence models supported by the wireless device, in a similar manner as artificial intelligence model identifier information in the system information provided by the cell may identify one or more artificial intelligence models supported by the cell, at least according to some embodiments. In some instances, indicating support for an artificial intelligence model by the wireless device may indicate that the artificial intelligence model is already stored by the wireless device. Alternatively, such an indication may simply indicate that the wireless device is capable of using the artificial intelligence model, regardless of whether it is stored by the wireless device.

Additionally, or alternatively, the capability information could include any of various other information regarding the type of support for artificial intelligence based channel state information reporting provided by the wireless device. Such information could include one or more artificial intelligence model types or complexities supported by the wireless device, and/or one or more supported input types for artificial intelligence based channel state information reporting for the wireless device, among various possibilities.

In 506, the wireless device may determine an artificial intelligence model to use to perform channel state information reporting. The artificial intelligence model to use may be determined based at least in part on the type of artificial intelligence based channel state information reporting framework in use. For example, it may be possible for the artificial intelligence based channel state information reporting framework to be network controlled, wireless device controlled, or controlled independently for each of the network and the wireless.

In a network controlled framework, the wireless device may determine the artificial intelligence model to use based on information received from the serving cell. For example, the wireless device may determine to use an artificial intelligence model indicated to be supported in the system information or in wireless device specific RRC information provided by the cell (e.g., as identified using an artificial intelligence model identifier) in such a scenario.

It may be possible for the wireless device to obtain the determined artificial intelligence model (or at least the artificial intelligence encoder portion of the artificial intelligence model), e.g., in case the wireless device does not already have the artificial intelligence model stored at the wireless device. For example, in a network controlled framework, the wireless device may obtain the artificial intelligence model from the network by providing a request for the artificial intelligence model to the serving cell, for example using RRC control signaling or a media access control (MAC) control element (CE), among various possibilities. The wireless device may receive the artificial intelligence model from the serving cell in response to the request, for example by way of a physical downlink shared channel (PDSCH) transmission. Once the artificial intelligence model has been downloaded, the wireless device may store the artificial intelligence model, e.g., for use with the current serving cell and/or potentially for use on subsequent occasions with other cells. Note that the wireless device may potentially obtain multiple artificial intelligence models in such a manner. For example, in case the wireless device undergoes mobility (e.g., handover or cell re-selection) to a new cell, it may be possible that the wireless device determines to use a different artificial intelligence model, which is not already stored by the wireless device, and performs a similar procedure to request and download that artificial intelligence model from the new cell. It may also be possible for the wireless device to obtain one or more artificial intelligence models in other ways; for example, a wireless device could be pre-provisioned with one or more artificial intelligence models, and/or may obtain one or more artificial intelligence models via over-the-air update from sources other than the cellular network that operates the serving cell, such as from a server associated with a device vendor of the wireless device. Note that any of various possible formats may be used to provide the artificial intelligence model data (e.g., including the structure, weights, and bias, for a neural network type artificial intelligence model, as one possibility).

Note that while a network controlled framework for artificial intelligence based channel state information reporting may be relatively simple to implement at the network side, at least in some instances, such an approach may limit the possibilities for wireless device differentiation for potentially improved performance, e.g., since the artificial intelligence encoder and decoder may be jointly trained at the network side.

In some instances, it may be possible that the wireless device can modify the artificial intelligence model selected for use for the artificial intelligence based channel state information reporting, for example in a network controlled framework in which the wireless device received the artificial intelligence model from the serving cell. Such functionality may provide at least some support for wireless device differentiation. For example, the wireless device may perform thinning, trimming, and quantization of neural network weight, e.g., to reduce the complexity based on characteristics specific to the wireless device and/or a preferred power consumption/complexity/performance profile for the wireless device. In some instances, the wireless device may perform further offline training and fine tune the encoder and/or decoder portion of the artificial intelligence model. In case the wireless device performs such modifications to the encoder portion, it may be the case that the decoder portion (e.g., implemented at the cellular base station) is unaffected. Alternatively, it may be possible that the wireless device additional offline training is used to fine tune both the encoder and the decoder portions of the artificial intelligence model. In such a scenario, the wireless device may send the refined artificial intelligence decoder weights to the cellular base station, e.g., for aggregation. At least in some instances, such modifications and fine tuning may be limited to model weights/bias without affecting the structure of the artificial intelligence model. The cellular base station may be able to aggregate the feedback of the wireless device and potentially similar feedback from other wireless devices and update the artificial intelligence model decoder. The cellular base station may further provide an update to the wireless device to indicate whether the artificial intelligence model decoder has been updated, which may affect which potential modifications (if any) to the artificial intelligence model encoder to use when performing channel state information reporting using the determined artificial intelligence model, for example in order to maintain joint optimization of the encoder and decoder portions of the artificial intelligence model.

For still greater possible wireless device differentiation and flexibility, a wireless device controlled framework for artificial intelligence based channel state information reporting may be used, if desired. According to such a framework, it may be the case that the artificial intelligence encoder and the artificial intelligence decoder for the artificial intelligence model selected by the wireless device are trained via centralized offline training at the wireless device side. Such training for one or more models may be performed by a wireless device vendor using aggregated field collected data and/or simulation data for various cell types, various channel conditions and/or other scenario elements, and the trained model(s) may be provided to wireless devices associated with that wireless device vendor, as one possibility. As another possibility, the training may be performed by the wireless device using field collected data from the wireless device. The artificial intelligence model (or at least the artificial intelligence decoder portion) may be provided from the wireless device to the cellular base station once the wireless device has selected the artificial intelligence model to use to perform channel state information reporting. For example, the model may be provided by way of a physical uplink shared channel (PUSCH) transmission, according to some embodiments. At least according to some embodiments, such a wireless device controlled framework may thus provide for very flexible wireless device implementation and differentiation, but may require significantly higher gNB complexity than a network controlled framework may require, e.g., due to the need to potentially manage numerous different artificial intelligence decoders for different wireless devices.

Another possible approach that can be used includes a framework in which artificial intelligence model handling is controlled independently for each of the network and the wireless device. According to such a framework, artificial intelligence model training may be performed on the wireless device side for the artificial intelligence encoder, and on the network side for the artificial intelligence decoder. In such a scenario, an interface defining the encoder output format (e.g., to facilitate use of the artificial intelligence encoder output by the artificial intelligence decoder at the cellular base station) may be specified, e.g., to support interworking between the independently trained artificial intelligence model portions; the structure and training of the different portions of the artificial intelligence model may otherwise be independently determined by the network and the wireless device. Such an approach may provide greater overall flexibility in artificial intelligence model training, implementation, and device or network specific differentiation to each of the wireless device and the cellular network than a network controlled framework or a wireless device controlled framework, but may suffer from performance loss in comparison to approaches that include joint artificial intelligence encoder and decoder optimization, at least according to some embodiments.

In 508, the wireless device may perform channel state information reporting using the determined artificial intelligence model. The channel state information reporting using the determined artificial intelligence model may be performed for a scheduled periodic channel state information report or for an aperiodic channel state information (AP-CSI) request. The request may explicitly indicate to perform the channel state information reporting using the artificial intelligence model, or use of the artificial intelligence model may be implied (e.g., based on previous negotiations to select an artificial intelligence model to use for channel state information reporting, implicitly configured in compliance with standard specifications, or in accordance with a proprietary agreement between a wireless device vendor and a network operator, among various possibilities). At least according to some embodiments, the perform the channel state information reporting, the wireless device may perform channel measurements, provide input to the artificial intelligence encoder based on the channel measurements in accordance with the supported input type for the artificial intelligence encoder, perform encoder inferencing using the artificial intelligence encoder based on the provided input, and report the output (e.g., in accordance with the supported output type for the artificial intelligence encoder) to the cellular base station. Note that it may be the case that one or more new report types are added (e.g., in 3GPP Technical Specifications) for artificial intelligence based AP-CSI reporting. Such a new report type (or types) could be specified to account for potential elements of artificial intelligence based AP-CSI reporting such as artificial intelligence based channel feedback, artificial intelligence based eigenvector feedback, artificial intelligence model identifier used for the feedback, field length information (number of bits, etc.), and/or any of various other elements.

The cellular base station may receive the channel state information reporting from the wireless device, and may provide the artificial intelligence encoder output as input to the artificial intelligence decoder, which may in turn perform decoder inferencing to determine the reported channel state between the wireless device and the cellular base station. As previously noted herein, the cellular base station may use this information in any of various ways, including for modulation and coding scheme selection, precoding matrix selection, rank selection, and/or for determining any of various other physical layer characteristics of communication between the wireless device and the cellular base station.

Thus, at least according to some embodiments, the method of FIG. 5 may be used to provide a framework according to which a wireless device can be configured to perform artificial intelligence based channel state information measurements and reporting, at least in some instances.

Figure 6:
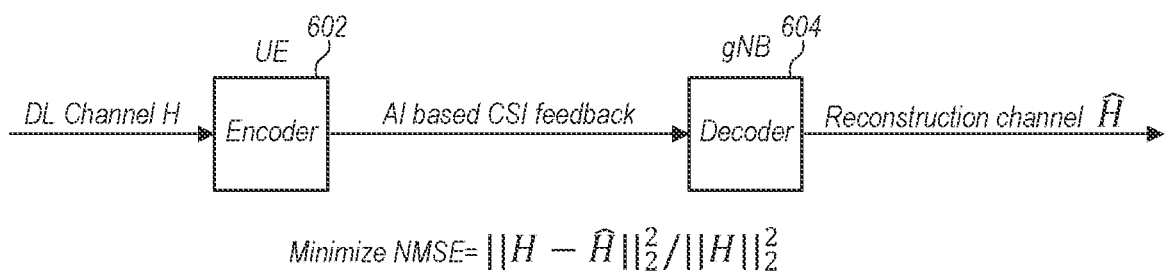
FIG. 6 illustrates aspects of one possible approach to implementing artificial intelligence based channel state information reporting, according to some embodiments.
Figure 7:
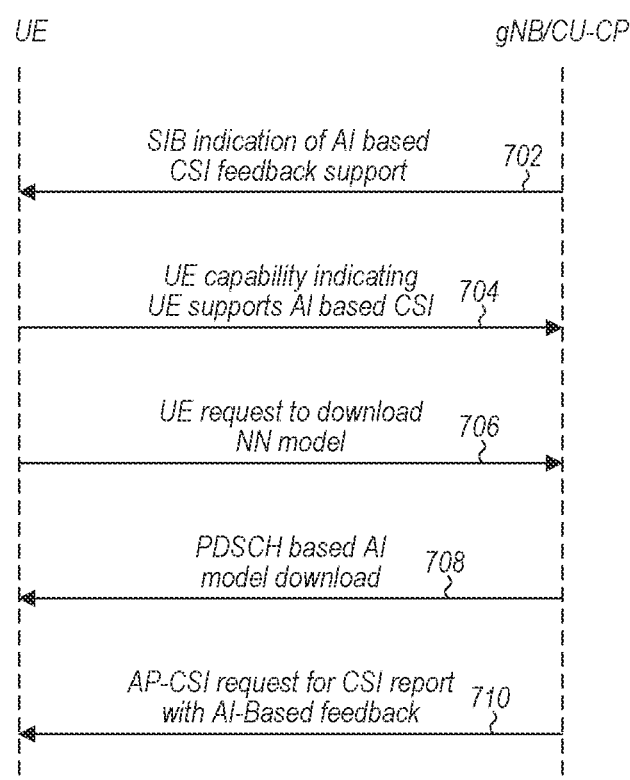
FIG. 7 is a signal flow diagram illustrating aspects of a specific example scenario in which artificial intelligence based channel state information reporting is supported in a wireless communication system, according to some embodiments.

FIGS. 6-7 and Additional Information

FIGS. 6-7 illustrate further aspects that might be used in conjunction with the method of FIG. 5 if desired. It should be noted, however, that the exemplary details illustrated in and described with respect to FIGS. 6-7 are not intended to be limiting to the disclosure as a whole: numerous variations and alternatives to the details provided herein below are possible and should be considered within the scope of the disclosure.

It may be possible to apply artificial intelligence (AI) based techniques, for example including the use of any of a variety of machine learning tools, to the establishment and maintenance of the air interface (or physical layer) portion of cellular communications. For example, use cases for artificial intelligence in such a context could include for CSI feedback, beam management, reference signal reduction with AI based channel estimator, positioning optimization, etc. In order to potentially incorporate such techniques, it may be useful to provide a framework for coordination between a wireless device and a cellular network to determine when and how such techniques can be used.

There may be a variety of possible approaches to providing such a framework. As one possibility, a network controlled AI based CSI framework may be provided. As another possibility, the AI based CSI framework may be network controlled and may include the possibility of UE updates. A still further possibility may include a UE centric AI based CSI framework. A yet further possibility may include the UE and network performing separate AI training and optimization, with limited coordination such as only specifying an encoder output format for AI based CSI feedback.

AI based CSI reporting may be implemented in any of a variety of ways. FIG. 6 illustrates aspects of one possible approach to implementing AI based CSI reporting, according to some embodiments. In the illustrated scenario, the CSI feedback may be formulated as a joint optimization of encoder and decoder. As one possibility, a normalized mean square error may be used as the optimization metric. The encoder and the decoder may be jointly trained. Various neural network types (or other types of AI or machine learning tools) can be trained and tested, e.g., depending on the desired tradeoffs between complexity, overhead, performance, and/or other characteristics. Thus, in a system using the approach of FIG. 6 to implement AI based CSI reporting, a UE 602 may receive a downlink channel ("H") and may perform encoder inferencing and provide AI based CSI feedback to a gNB 604. The gNB 604 may perform decoder inferencing to determine a reconstruction channel ("Ĥ"). The AI based CSI feedback mechanism may be trained to minimize normalized mean square error (NMSE), which may be defined using the following equation, at least according to some embodiments.

$$\|H-\hat{H}\|_2^2/\|H\|_2^2$$

In order to provide the capability to coordinate and perform signaling to enable such AI based CSI feedback (and/or other approaches to performing AI based CSI feedback), as previously noted, one approach may include a network controlled AI based CSI framework. FIG. 7 is a signal flow diagram illustrating aspects of such an approach, according to some embodiments.

According to such a network controlled AI based CSI framework, it may be the case that both AI encoder and AI decoder are offline trained at the network (e.g., using simulated data and/or field data). Encoder inferencing may be performed at the UE, while decoder inferencing may be performed at the gNB. In 702, the gNB (e.g., the centralized unit control plane (CU-CP) for a gNB) may provide an indication of AI based CSI feedback support in a system information block (SIB) broadcast or provided on-demand by the gNB. The indication could include a supported neural network (NN) identifier (ID). NN model description information could be indicated, such as input to AI encoder (e.g., channel based AI encoder/decoder, eigenvector based AI encoder/decoder), type of NN and complexity, output of AI encoder, etc. The UE may read the SIB, and based on the SIB content, in 704, may provide UE capability information indicating that the UE supports AI based CSI feedback. In another alternative, UE specific RRC configuration can be used to signal to the UE the supported NN ID and description. The reported UE capability might include one or more supported NN IDs (e.g., if the models for those NN IDs are already stored at the UE), supported input type (e.g., channel or eigenvector), supported NN type and complexity, etc.

In case the UE does not already have the model supported by the gNB stored at the UE, it may be possible for the UE to download the AI model, for example via physical downlink shared channel (PDSCH) transmission. In such a scenario (e.g., if the AI model ID is not stored at the UE side already), in 706, the UE may request to download the NN model. The UE may be able to request a particular AI model ID based on the description provided in the SIB and/or the UE implementation (e.g., which features are supported by the UE), for example including any or all of various aspects such as channel based or eigenvector based AI model, NN type, complexity, etc. Note that it may be possible that a UE needs to request another AI model ID after performing handover, e.g., in case the new cell supports a different NN ID (e.g., due to different cell architecture, infrastructure vendor, public land mobile network (PLMN), etc.). In 708, the PDSCH based model download may be performed. The PDSCH transmission to transfer the AI encoder to the UE may be unicast PDSCH or group cast PDSCH, according to various embodiments. Note that any of a variety of possible AI model data formats (e.g., including structure, weights, bias, etc.) may be used to provide the requested AI model, according to various embodiments. In 710, the gNB may provide an aperiodic CSI (AP-CSI) request for a CSI report with AI based feedback to the UE. A report type for AI based AP-CSI reporting may be defined to support such reporting, for example including specifying various characteristics parameters, fields, or other aspects such as AI based channel feedback, AI based eigenvector feedback, number of bits, NN ID used for the encoder, etc.

Note that identification of NN IDs can be managed by the network at any of a variety of levels of granularity. For example, different NN IDs can be unique per PLMN, or per AMF, or per CU-CP, according to various embodiments. Note also that it may be useful to standardize the NN description for a given NN ID, for example to facilitate clear communication of the characteristics and parameters of a given NN ID, such as input, output, and model description parameters (e.g., convolutional neural network (CNN), recurrent neural network (RNN), layers, etc.).

Note that in a fully network controlled approach to performing AI based CSI reporting, since the AI encoder and decoder are jointly trained at the network side, it may be possible that UE feature differentiation may be limited or not possible. The UE may perform capability reporting indicating support of AI based CSI feedback, input type and output type, potentially NN type, and may use a network provided AI model supported by a serving cell for the UE according to its capabilities. However, in other embodiments, it may be possible to allow UE differentiation; for example, it may be possible that after receiving the AI encoder, the UE can perform thinning, trimming, and quantization of NN weight (e.g., to reduce the complexity) and/or otherwise adapt the AI encoder for the UE.

In some embodiments, it may be possible for a UE to perform further offline training and fine tune the AI encoder after downloading the AI encoder and AI decoder based on the NN ID and/or other model description information provided by a cell. Such an approach may allow for UE differentiation, may potentially result in improvement on the default AI encoder, and/or may better fit the UE's implementing and performance tradeoffs. At least according to some embodiments, it may be possible to support such an approach without any changes to the AI decoder at the gNB side.

As another possibility, it may be possible for a UE to perform further offline training and fine tune both the AI encoder and AI decoder. Such an approach may potentially further improve overall performance by optimizing the AI encoder and decoder together. The UE can send the AI decoder weight and/or other information back to the gNB for aggregation. It may be possible that only model weights/bias are adjusted by the UE (e.g., and not the model structure, to ease the gNB's aggregation). The gNB may optionally aggregate and update the AI decoder based on the UE feedback (and potentially based on aggregated feedback from other UEs served by the cell and/or by cells using the same AI model) The gNB can indicate whether the AI decoder is updated, or if the UE needs to perform any AI encoder adjustments without expecting any change of the AI decoder at the gNB side.

In a UE controlled approach to AI based CSI feedback, centralized offline training of the AI encoder and AI decoder may be performed on the UE side. For example, UE device vendors may perform such offline training for specific UE models using simulated and/or aggregated field collected data, and may provide resulting AI model data on the UE during initial configuration and/or via over the air updates. In such a scenario, the UE may be able to send the AI decoder model to the gNB, for example via physical uplink shared channel (PUSCH) transmission. Such an approach may be relatively complex to manage on the network side, for example as it may result in a gNB managing multiple different AI decoders for different UEs. However, such an approach may support very flexible UE implementation options and potential for UE differentiation for performance.

In an approach with minimal coordination between the UE and the network, it may be possible to perform offline training at the UE side for the AI encoder and offline training at the gNB side for the AI decoder. For such an approach, at least the encoder output format may be defined, e.g., in order to provide an interface between the AI encoder and the AI decoder. Such an approach may allow for both very flexible UE and network implementation options, but may potentially suffer from performance loss in comparison to approaches that include joint AI encoder and AI decoder optimization, such as may occur in the network controlled AI based CSI reporting framework or the UE controlled AI based CSI reporting framework embodiments previously described herein.

In the following further exemplary embodiments are provided.

One set of embodiments may include a method, comprising: by a wireless device: receiving system information for a first cell, wherein the system information indicates that the first cell supports artificial intelligence based channel state information reporting; providing capability information indicating that the wireless device supports artificial intelligence based channel state information reporting; determining to use a first artificial intelligence model to perform channel state information reporting with the first cell based at least in part on the system information for the first cell; and performing channel state information reporting with the first cell using the first artificial intelligence model.

According to some embodiments, the system information for the first cell further includes one or more parameters for the artificial intelligence based channel state information reporting for the first cell, wherein the one or more parameters indicate one or more of: one or more artificial intelligence model identifiers supported by the first cell; one or more artificial intelligence model types or complexities supported by the first cell; one or more supported input types for artificial intelligence based channel state information reporting for the first cell; or one or more supported output types for artificial intelligence based channel state information reporting for the first cell.

According to some embodiments, the capability information further includes one or more parameters, wherein the one or more parameters indicate support by the wireless device for one or more of: one or more artificial intelligence model identifiers for artificial intelligence based channel state information reporting; one or more artificial intelligence model types or complexities for artificial intelligence based channel state information reporting; or one or more supported input types for artificial intelligence based channel state information reporting.

According to some embodiments, the method further comprises: determining that the first artificial intelligence model is not currently stored by the wireless device; transmitting a request for the first artificial intelligence model based at least in part on the first artificial intelligence model not currently being stored by the wireless device; and receiving the first artificial intelligence model.

According to some embodiments, the request for the first artificial intelligence model is transmitted to the first cell, wherein the first artificial intelligence model is received from the first cell via a physical downlink shared channel (PDSCH) transmission.

According to some embodiments, the method further comprises: receiving an aperiodic channel state information (AP-CSI) request for a channel state information report with artificial intelligence based feedback for the first cell, wherein the channel state information reporting with the first cell using the first artificial intelligence model is performed based at least in part on the AP-CSI request.

According to some embodiments, the method further comprises: performing handover to a second cell; determining to use a second artificial intelligence model to perform channel state information reporting with the second cell; and performing channel state information reporting with the second cell using the second artificial intelligence model.

According to some embodiments, the method further comprises: modifying the first artificial intelligence model, wherein the channel state information reporting with the first cell is performed using the first artificial intelligence model as modified by the wireless device.

According to some embodiments, the method further comprises: providing an indication of one or more modifications to the first artificial intelligence model to the first cell.

According to some embodiments, the method further comprises: providing the first artificial intelligence model to the first cell via a physical uplink shared channel (PUSCH) transmission.

Another set of embodiments may include a wireless device, comprising: one or more processors; and a memory having instructions stored thereon, which when executed by the one or more processors, perform steps of any of the preceding examples.

Yet another set of embodiments may include a computer program product, comprising computer instructions which, when executed by one or more processors, perform steps of the any of the preceding examples.

Still another set of embodiments may include a method, comprising: by a cellular base station: providing system information for a first cell, wherein the system information indicates that the first cell supports artificial intelligence based channel state information reporting; receiving capability information from a wireless device, wherein the capability information indicates that the wireless device supports artificial intelligence based channel state information reporting; receiving artificial intelligence based channel state information reporting from the wireless device; and performing channel estimation for the wireless device based at least in part on the artificial intelligence based channel state information reporting from the wireless device.

According to some embodiments, the system information further includes one or more parameters for the artificial intelligence based channel state information reporting for the first cell, wherein the one or more parameters indicate one or more of: one or more artificial intelligence model identifiers supported by the first cell; one or more artificial intelligence model types or complexities supported by the first cell; one or more supported input types for artificial intelligence based channel state information reporting for the first cell; or one or more supported output types for artificial intelligence based channel state information reporting for the first cell.

According to some embodiments, the capability information further includes one or more parameters, wherein the one or more parameters indicate support by the wireless device for one or more of one or more artificial intelligence model identifiers for artificial intelligence based channel state information reporting; one or more artificial intelligence model types or complexities for artificial intelligence based channel state information reporting; or one or more supported input types for artificial intelligence based channel state information reporting.

According to some embodiments, the method further comprises: receiving a request from the wireless device for a first artificial intelligence model; and providing the first artificial intelligence model to the wireless device in response to the request from the wireless device for the first artificial intelligence model, wherein the first artificial intelligence model is provided via a physical downlink shared channel (PDSCH) transmission.

According to some embodiments, the method further comprises: transmitting an aperiodic channel state information (AP-CSI) request for a channel state information report with artificial intelligence based feedback for the first cell to the wireless device, wherein the artificial intelligence based channel state information reporting is received from the wireless device in response to the AP-CSI request.

According to some embodiments, the system information indicates to use a first artificial intelligence model to perform artificial intelligence based channel state information reporting with the first cell, wherein the method further comprises: receiving an indication of one or more modifications to the first artificial intelligence model from the wireless device; and modifying the first artificial intelligence model based at least in part on the indication of one or more modifications to the first artificial intelligence model received from the wireless devices.

According to some embodiments, modifying the first artificial intelligence model is further based in part on indications of one or more modifications to the first artificial intelligence model received from multiple additional wireless devices.

According to some embodiments, the method further comprises: receiving a first artificial intelligence model from the wireless device via a physical uplink shared channel (PUSCH) transmission, wherein the channel estimation for the wireless device is performed using the first artificial intelligence model.

A further set of embodiments may include a cellular base station, comprising: one or more processors; and a memory having instructions stored thereon, which when executed by the one or more processors, perform steps of any of the preceding examples.

A still further set of embodiments may include a computer program product, comprising computer instructions which, when executed by one or more processors, perform steps of any of the preceding examples.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
receiving system information for a first cell, wherein the system information indicates that the first cell supports artificial intelligence based channel state information reporting;
providing capability information indicating that a wireless device supports artificial intelligence based channel state information reporting;
determining to use a first artificial intelligence model to perform channel state information reporting with the first cell based at least in part on the system information for the first cell;
receiving an aperiodic channel state information (AP-CSI) request for a channel state information report with artificial intelligence based feedback for the first cell; and
performing channel state information reporting with the first cell using the first artificial intelligence model, wherein the channel state information reporting with the first cell using the first artificial intelligence model is performed based at least in part on the AP-CSI request.

2. The method of claim 1,
wherein the system information for the first cell further includes one or more parameters for the artificial intelligence based channel state information reporting for the first cell, wherein the one or more parameters indicate one or more of:
one or more artificial intelligence model identifiers supported by the first cell;
one or more artificial intelligence model types or complexities supported by the first cell;
one or more supported input types for artificial intelligence based channel state information reporting for the first cell; or
one or more supported output types for artificial intelligence based channel state information reporting for the first cell.

3. The method of claim 1,
wherein the capability information further includes one or more parameters, wherein the one or more parameters indicate support by the wireless device for one or more of:
one or more artificial intelligence model identifiers for artificial intelligence based channel state information reporting;
one or more artificial intelligence model types or complexities for artificial intelligence based channel state information reporting; or
one or more supported input types for artificial intelligence based channel state information reporting.

4. The method of claim 1, wherein the method further comprises:
determining that the first artificial intelligence model is not currently stored by the wireless device;
transmitting a request for the first artificial intelligence model based at least in part on the first artificial intelligence model not currently being stored by the wireless device; and
receiving the first artificial intelligence model.

5. The method of claim 4,
wherein the request for the first artificial intelligence model is transmitted to the first cell,
wherein the first artificial intelligence model is received from the first cell via a physical downlink shared channel (PDSCH) transmission.

6. The method of claim 1, wherein the method further comprises:
performing handover to a second cell;
determining to use a second artificial intelligence model to perform channel state information reporting with the second cell; and
performing channel state information reporting with the second cell using the second artificial intelligence model.

7. The method of claim 1, wherein the method further comprises:
modifying the first artificial intelligence model,
wherein the channel state information reporting with the first cell is performed using the first artificial intelligence model as modified by the wireless device.

8. The method of claim 7, wherein the method further comprises:
providing an indication of one or more modifications to the first artificial intelligence model to the first cell.

9. The method of claim 1, wherein the method further comprises:
providing the first artificial intelligence model to the first cell via a physical uplink shared channel (PUSCH) transmission.

10. A method, comprising:
providing system information for a first cell, wherein the system information indicates that the first cell supports artificial intelligence based channel state information reporting;
receiving capability information from a wireless device, wherein the capability information indicates that the wireless device supports artificial intelligence based channel state information reporting;
transmitting an aperiodic channel state information (AP-CSI) request for a channel state information report with artificial intelligence based feedback for the first cell to the wireless device;
receiving artificial intelligence based channel state information reporting from the wireless device, wherein the artificial intelligence based channel state information reporting is responsive to the AP-CSI request; and
performing channel estimation for the wireless device based at least in part on the artificial intelligence based channel state information reporting from the wireless device.

11. The method of claim 10,
wherein the system information further includes one or more parameters for the artificial intelligence based channel state information reporting for the first cell, wherein the one or more parameters indicate one or more of:
one or more artificial intelligence model identifiers supported by the first cell;
one or more artificial intelligence model types or complexities supported by the first cell;
one or more supported input types for artificial intelligence based channel state information reporting for the first cell; or
one or more supported output types for artificial intelligence based channel state information reporting for the first cell.

12. The method of claim 10,
wherein the capability information further includes one or more parameters, wherein the one or more parameters indicate support by the wireless device for one or more of:
one or more artificial intelligence model identifiers for artificial intelligence based channel state information reporting;
one or more artificial intelligence model types or complexities for artificial intelligence based channel state information reporting; or
one or more supported input types for artificial intelligence based channel state information reporting.

13. The method of claim 10, wherein the method further comprises:
receiving a request from the wireless device for a first artificial intelligence model; and
providing the first artificial intelligence model to the wireless device in response to the request from the wireless device for the first artificial intelligence model, wherein the first artificial intelligence model is provided via a physical downlink shared channel (PDSCH) transmission.

14. The method of claim 10,
wherein the system information indicates to use a first artificial intelligence model to perform artificial intelligence based channel state information reporting with the first cell, wherein the method further comprises:
receiving an indication of one or more modifications to the first artificial intelligence model from the wireless device; and
modifying the first artificial intelligence model based at least in part on the indication of one or more modifications to the first artificial intelligence model received from the wireless device.

15. The method of claim 14,
wherein modifying the first artificial intelligence model is further based in part on indications of one or more modifications to the first artificial intelligence model received from multiple additional wireless devices.

16. The method of claim 10, wherein the method further comprises:
receiving a first artificial intelligence model from the wireless device via a physical uplink shared channel (PUSCH) transmission,
wherein the channel estimation for the wireless device is performed using the first artificial intelligence model.

17. A processor configured to:
receive system information for a first cell, wherein the system information indicates that the first cell supports artificial intelligence based channel state information reporting;
provide capability information indicating that a wireless device supports artificial intelligence based channel state information reporting;
determine to use a first artificial intelligence model to perform channel state information reporting with the first cell based at least in part on the system information for the first cell;
receive an aperiodic channel state information (AP-CSI) request for a channel state information report with artificial intelligence based feedback for the first cell; and
perform channel state information reporting with the first cell using the first artificial intelligence model, wherein the channel state information reporting with the first cell using the first artificial intelligence model is performed based at least in part on the AP-CSI request.

18. The processor of claim 17, wherein the system information for the first cell further includes one or more parameters for the artificial intelligence based channel state information reporting for the first cell, wherein the one or more parameters indicate one or more of:
one or more artificial intelligence model identifiers supported by the first cell;
one or more artificial intelligence model types or complexities supported by the first cell;
one or more supported input types for artificial intelligence based channel state information reporting for the first cell; or
one or more supported output types for artificial intelligence based channel state information reporting for the first cell.

19. The processor of claim 17, wherein the processor is further configured to:
determine that the first artificial intelligence model is not currently stored by the wireless device;
transmit a request for the first artificial intelligence model based at least in part on the first artificial intelligence model not currently being stored by the wireless device; and
receive the first artificial intelligence model.

20. The processor of claim 17, wherein the processor is further configured to:
perform handover to a second cell;
determine to use a second artificial intelligence model to perform channel state information reporting with the second cell; and
perform channel state information reporting with the second cell using the second artificial intelligence model.

* * * * *